(12) United States Patent
Marukawa et al.

(10) Patent No.: US 8,338,016 B2
(45) Date of Patent: Dec. 25, 2012

(54) TAPERED BATTERY PACK

(75) Inventors: Shuhei Marukawa, Toyohashi (JP); Toyohiko Eto, Toyota (JP); Masahiro Misu, Nisshin (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 1455 days.

(21) Appl. No.: 11/643,399

(22) Filed: Dec. 20, 2006

(65) Prior Publication Data

US 2007/0141455 A1    Jun. 21, 2007

(30) Foreign Application Priority Data

Dec. 20, 2005  (JP) ................................ 2005-366902

(51) Int. Cl.
*H01M 10/50* (2006.01)
*H01M 2/12* (2006.01)
*B60R 16/04* (2006.01)

(52) U.S. Cl. .............. 429/120; 429/62; 429/71; 429/96; 429/99; 429/100; 429/163; 429/176; 180/68.5

(58) Field of Classification Search .................. D13/103, D13/104

See application file for complete search history.

(56) References Cited

U.S. PATENT DOCUMENTS

| 5,204,609 | A  | * | 4/1993  | Alisauski ...................... 320/107 |
| 5,490,572 | A  | * | 2/1996  | Tajiri et al. ................... 180/65.1 |
| 2001/0030069 | A1 | * | 10/2001 | Misu et al. ................... 180/68.1 |
| 2002/0187390 | A1 | * | 12/2002 | Kimoto et al. ................. 429/99 |

FOREIGN PATENT DOCUMENTS

| JP | 5-48281 A | 2/1993 |
| JP | 9-45471   | 2/1997 |
| JP | 2000-133217 A | 5/2000 |

OTHER PUBLICATIONS

Definition of Rectangle retrieved from http://mathworld.wolfram.com on Jun. 3, 2010.*

Notice of Grounds for Rejection mailed Dec. 6, 2011, issued in corresponding Japanese Application No. 2005-366902, filed Dec. 20, 2005, 2 pages.

* cited by examiner

*Primary Examiner* — Robert Hodge

(74) *Attorney, Agent, or Firm* — Christensen O'Connor Johnson Kindness PLLC

(57) ABSTRACT

A battery pack to be mounted in a vehicle incorporates a battery stack and a cooling fan. An air intake is formed in a side face located in the vicinity of the cooling fan. In consideration of passengers entering and exiting the vehicle, the air intake is formed as well in a plane generated as a result of removal of a corner. A louver for preventing intrusion of extraneous matter is disposed at the front of the air intake. A decrease in the amount of cooling air induced by the louver is lessened by means of forming the air intake in the plane.

3 Claims, 5 Drawing Sheets

TAPERED BATTERY PACK

PRIORITY INFORMATION

This application claims priority to Japanese Patent Application No. 2005-366902 filed on Dec. 20, 2005, which is incorporated herein by reference in its entirety.

BACKGROUND OF THE INVENTION

1. Field of the Invention

The present invention relates to a battery pack, and more particularly, to the structure of an air intake of a battery pack mounted in a vehicle.

2. Related Art

A battery pack is mounted on a hybrid electric vehicle, a fuel-cell-powered vehicle, or an electric vehicle for storing electric power to be supplied to a drive motor. A battery pack has a battery stack, and an equipment box into which various pieces of equipment used for controlling the battery stack are to be incorporated.

FIG. 6 shows an external perspective view of a related-art battery pack 100. The battery pack 100 has a battery stack and various types of devices used for controlling the battery stack. The battery stack is incorporated in a first module section 100a, and the various devices are incorporated in a second module section 100b. An air intake 102 is formed in one side surface of the battery pack 100, and the air intake 102 is connected to a duct for cooling air. Cooling air taken in via the air intake 102 flows through the battery stack from bottom to top or from top to bottom to thus cool the battery stack, and is discharged from an air outlet. In order to prevent intrusion of extraneous matter, the air intake 102 is usually provided with a filter, a louver, and the like. FIG. 7 shows a fragmentary enlarged view of the neighborhood of the air intake 102 of the battery pack 100, which is an example where a louver 104 of grid pattern is disposed at the front face of the air intake 102.

Japanese Patent Laid-Open Publication No. Hei 9-45471 describes a configuration which relates to an electromagnetic range and prevents intrusion of extraneous matter and water by interposing, between the air intake and a cooling fan, a shield plate having a drain section in a lower portion thereof.

A louver, or the like, is effective for preventing intrusion of extraneous matter, which consequently occupies an area obstructed by the louver. Accordingly, a loss in the pressure of the cooling air and a decrease in the flow rate of the same arise. Moreover, an area of the louver through which the cooling air flows is susceptible to a reduction in cross section. As a result, the flow rate of the cooling air increases, to thus generate an anomalous sound.

SUMMARY OF THE INVENTION

The present invention provides a battery pack capable of ensuring a flow rate of a medium even when an extraneous matter intrusion prevention member, such as a louver or the like, is provided.

The present invention provides a battery pack to be mounted in a vehicle, comprising:
a battery stack; and
an air intake for taking into the battery pack a medium which adjusts the temperature of the battery stack, wherein
a projected bottom face of the battery pack is of an essentially rectangular shape;
the air intake is formed along one of shorter sides of the battery pack; and
an opening of the air intake is longer than the shorter side of the battery pack.

The present invention also provides battery pack to be mounted in a vehicle, comprising:
a battery stack; and
a fan built in an end of the battery pack for supplying a medium which adjusts the temperature of the battery stack, wherein
a tapered face is formed at a corner of an end where the fan of the battery pack is built in; and
an air intake for a medium taken in by the fan is provided in the closest plane opposing the fan at the end of the battery pack and the tapered face.

According to the present invention, the opening of the air intake formed along one of the shorter sides of the battery pack is set so as to become longer than the shorter side. Alternatively, the air intake is formed in a tapered face formed in the corner of the battery pack, as well. Thus, even when an extraneous matter intrusion prevention member, such as a louver, is provided, the amount of supplied temperature adjustment medium can be ensured. The tapered face in the corner of the battery pack leads to a reduction in the outer dimension of the battery pack. Accordingly, space utility achieved when the battery pack is mounted in the vehicle can also be ensured.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

An embodiment of the present invention will be described hereinbelow by reference to the drawings.

Figure 1:
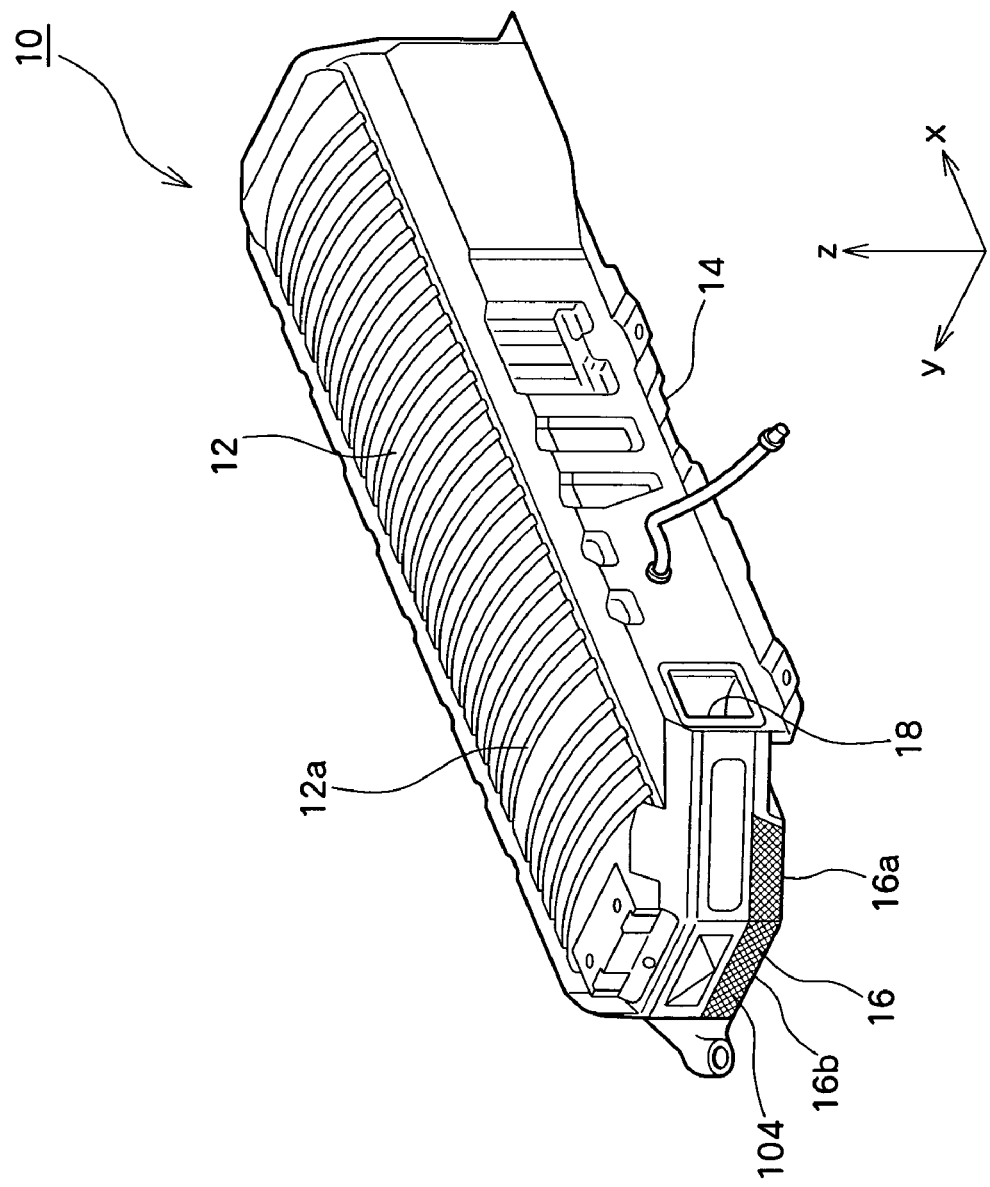
FIG. 1 is a perspective view of a battery pack according to an embodiment of the present invention.

FIG. 1 is an external perspective view of a battery pack 10 of the present embodiment. A battery case, which is an enclosure of the battery pack 10, has an upper case 12 for covering an upper portion of a battery stack and a lower case 14 for covering a lower portion of the same. The battery pack 10 has a built-in battery assembly (a battery stack). A plurality of battery modules, each formed from one or a plurality of cells such as a nickel-metal hydride battery or the like, are arranged (stacked) in parallel while a cooling passage is routed among the battery modules. End members provided at the respective ends of the cooling passage are assembled in a tied manner, to thus incorporate a battery assembly where battery modules are electrically connected in series with each other. Moreover, a cooling fan is disposed in the battery pack 10. An air intake 16 is formed in one side face of the battery pack 10; preferably, a face close to a cooling fan. More precisely, a projected bottom face of the battery pack 10 is of an essentially rectangular shape. The air intake 16 is provided along one of shorter sides of the rectangular shape. A grid-shaped louver 104 for preventing intrusion of extraneous matter is provided on the front face or an opening of the air intake 16. A filter may also be additionally provided in the air intake 16. The structure of the air intake 16 will be described in more detail. An air outlet 18 is formed in another side face of the battery pack 10. When the cooling fan is rotationally driven, the air in a passenger compartment is taken in the air intake 16 via the louver 104. The thus-taken cooling air is supplied to a chamber space formed between the battery stack and the lower case 14. The air then flows from a lower portion of the battery stack to an upper portion thereof by way of the cooling passage routed among the battery modules, to thus reach a chamber space defined between the battery stack and the upper case 12 and escape to the outside from the air outlet 18.

The upper case 12 of the battery pack 10 is not a planar surface, but has a predetermined curvature so as to protrude upwardly or outside of the battery pack 10, thereby assuming the geometry of an arch or a protruding surface. Moreover, the upper case 12 has groove-shaped bead portions 12a formed so as to protrude toward the inside of the battery pack 10. As illustrated, given that the longitudinal direction of the battery pack 10 is direction "x," the widthwise direction of the same perpendicular to the direction "x" is direction "y,"and the heightwise direction of the same is direction "z," the curvature of the upper case 12 lies in a plane y-z, and the bead portions 12a are also provided along the plane y-z. When the battery pack 10 is mounted in the vehicle in such a way that the longitudinal direction of the battery pack 10 coincides with the widthwise direction of the vehicle, the direction "x" coincides with the widthwise direction of the vehicle; the direction "y" coincides with the longitudinal direction of the vehicle; and the direction "z" coincides with the heightwise direction of the vehicle. The curvature of the upper case 12 lies in the longitudinal direction of the vehicle. A direction in which the battery stacks are stacked corresponds to the longitudinal direction; namely, the direction "x." The curvature of the upper case 12 can be said to lie in a direction perpendicular to the arrangement direction. The rigidity of the battery pack 10 against load from above can be enhanced by means of the geometry of an arch and the bead portions 12a.

The expression "projected bottom face" used herein signifies a geometry achieved when the battery pack is projected in the direction of the Z axis. Further, the expression "the projected bottom face is of an essentially rectangular shape" means that the geometry of the bottom face is of an essentially rectangular shape. As is described in connection with the gist of the present invention, variations, such as partial chipping of corners of the rectangle, formation of a projection in the center of a longer side of the rectangle, and the like, fall within the scope of an essentially rectangular shape.

In the present embodiment, the air intake 16 of the battery pack 10 is formed in three faces rather than in one face. Specifically, the air intake 16 is formed in three side faces among the side faces of the battery pack 10; namely, the closest side face opposing the cooling fan, and two side faces formed by slicing both corners of the battery pack 10 or chamfering shorter sides of the battery pack 10. The louver 104 is provided along the front of each of the three faces. Cooling air is taken in from the air intakes 16 formed in the three faces, by way of the louvers 104. Consequently, the opening of the air intake 16 in the present embodiment is longer than the shorter side of the battery pack 10. The faces formed by obliquely cutting the corners of the battery pack 10 are tapered faces, and the air intakes 16 can also be said to be formed in the tapered faces.

Figure 2:
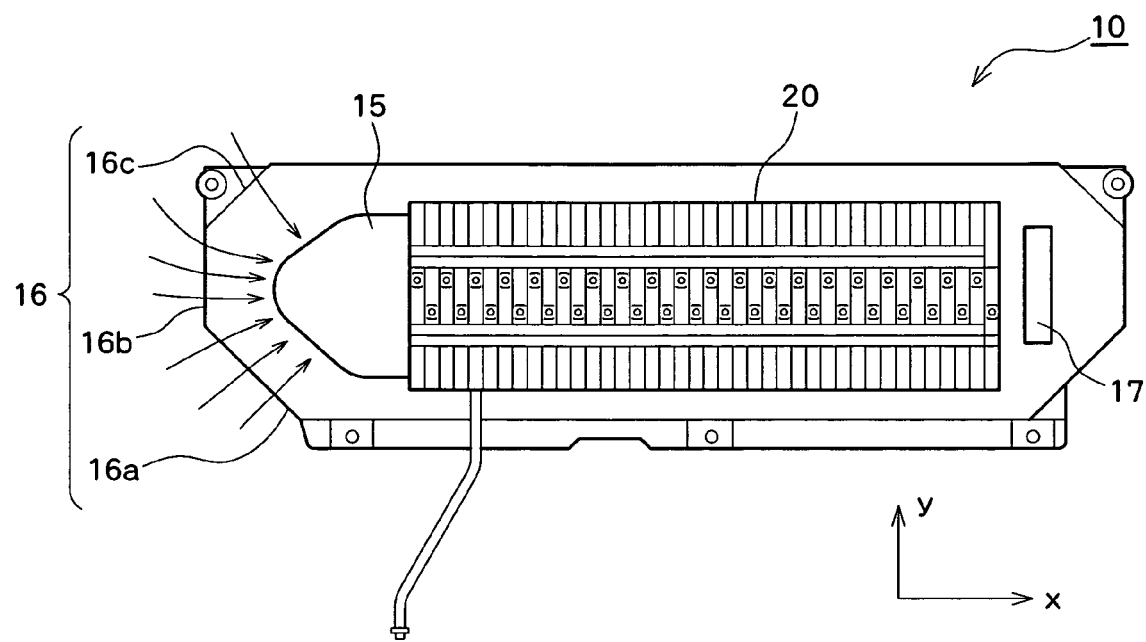
FIG. 2 is a descriptive view of the internal state of the battery pack.

FIG. 2 shows the internal structure of the battery pack 10 from which the upper case 12 has been removed. A battery stack 20 is formed by means of piling battery modules into a plurality of layers in the longitudinal direction (the direction "x") of the battery pack 10. In the present embodiment, the battery module includes an integral case which is a module exterior component, and six battery cells which are disposed in the integral case and separated from each other with partitions. The integral case is not particularly limited, but is made from, e.g., a resin. The six battery cells included in the battery module are electrically connected in series within the integral case. A cooling fan 15 for supplying a cooling air is placed at one end of the battery stack 20 along the direction X, and a control module 17 for controlling discharging and recharging operations of the battery stack 20 is placed at the other end. The control module 17 has a microprocessor; establishes data communication with a computer to be mounted in the vehicle; transmits to the vehicle computer status data pertaining to the battery stack 20; and controls the battery stack 20 in response to a command from the vehicle computer. The air intake 16 covered with the grid-shaped louver 104 is disposed in front of the cooling fan 15. As a result of activation of the cooling fan 15, cooling air is taken in from the passenger compartment as illustrated by the arrows in the drawing. The cooling air is supplied to a chamber space 24 formed between the lower portion of the battery stack 20 and the lower case 14 via the internal duct; and flows through the battery stack 20 from bottom to top (in a direction perpendicular to a sheet) via a cooling passage routed among the battery modules, to thus reach a chamber space 22 formed between an upper portion of the battery stack 20 and the upper case 12, thereby cooling the battery stack 20 with a desired cooling characteristic. In FIG. 1, the curve formed in the upper case 12 is formed over the entire longitudinal span of the battery pack 10. However, the curve may also be formed in only an area located immediately above the battery stack 20. Specifically, an area of the upper case 12 located immediately above the battery stack 20 is formed into a curve, and another area of the upper case 12 located immediately above the cooling fan 15 or the control module 17 may be formed into a planar surface.

The air intake 16used for taking in cooling air is built of three faces. First, one of the faces of the battery pack 10 is a plane 16b forming a side face (an adjacent side face) located adjacent to the cooling fan 15. Second, another face is a plane (a tapered face) 16a formed by obliquely cutting one corner of the battery pack 10. Third, the remaining face is a plane (another tapered face) 16c formed by cutting the other corner of the battery pack 10. The significance of cutting of the corners of the battery pack 10 or chamfering of both ends of the shorter sides is as follows. Specifically, when being mounted in the vehicle, the battery pack 10 is arranged in such a way that the longitudinal direction coincides with the widthwise direction of the vehicle. For instance, the battery pack 10 is disposed below a seat face of a rear seat of the vehicle located between right and left rear wheel houses 30 and 32. In this case, the battery pack 10 is disposed close to the feet of passengers in the rear seat. There is a potential risk of the corners of the battery pack hindering passengers of the rear seat from entering or exiting the vehicle, or the legroom in the rear seat becomes smaller. For these reasons, in order to facilitate entry and exiting of the passengers in the rear seat and ensure legroom for the passengers, the corners of the battery pack 10 are desirably cut to form tapered faces. Consequently, the plane (the tapered face) 16a and the plane (the tapered face) 16c are generated. The tapered faces formed by cutting or chamfering the corners in consideration of space utility achieved when the battery pack 10 is mounted in the vehicle are also actively utilized as the air intakes 16, thereby increasing the length of the opening of the air intake 16 and compensating for a decrease in the cross-sectional area of the flow passage induced by the louver 104 to thus ensure the flow rate of supplied air.

The battery pack 10 of the present embodiment has the built-in cooling fan 15, and the cooling fan operates so as to take cooling air into the battery pack 10. Specifically, the cooling air is withdrawn in a radial pattern centered on the cooling fan 15. Therefore, the cooling air can also be taken in from the planes 16a and 16c as well as from the plane 16b.

Figure 3:
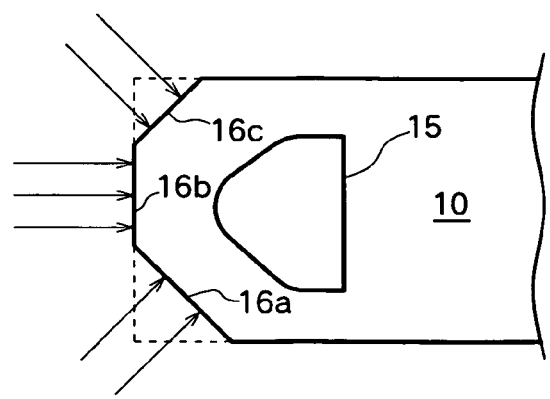
FIG. 3 is a schematic plan view of an air intake of the battery pack.
Figure 6:
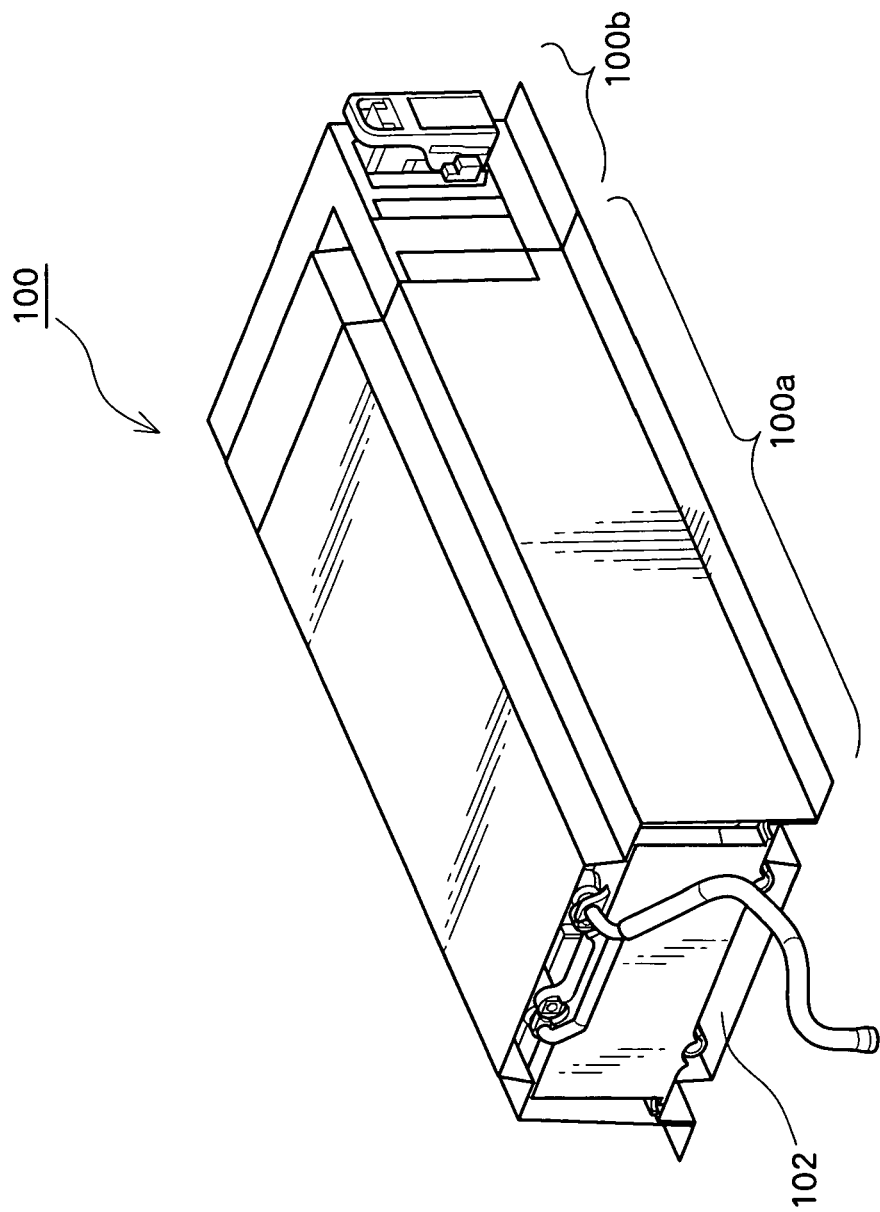
FIG. 6 is a block diagram of a related-art battery pack.
Figure 7:
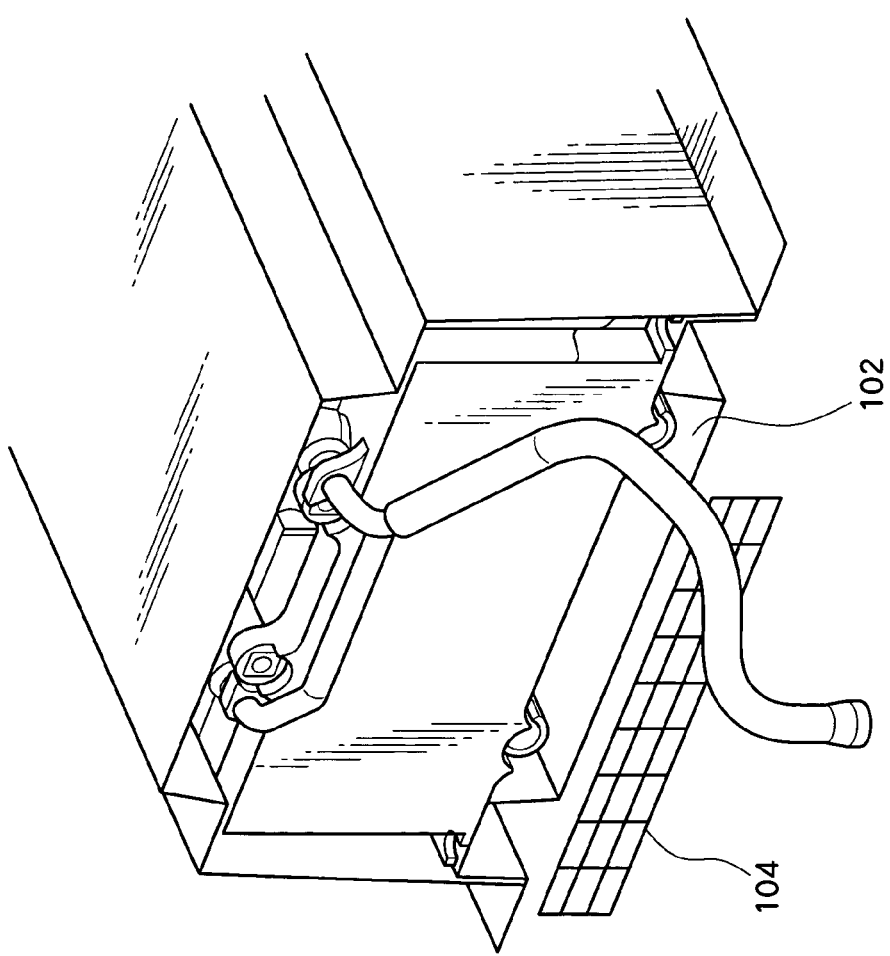
FIG. 7 is an enlarged view of the air intake shown in FIG. 6.

FIG. 3 schematically shows the plan view of the air intake 16 of the present embodiment. The air intake 16 is formed in each of the three planes 16a, 16b, and 16c surrounding the cooling fan 15. Cooling air is taken in via these air intakes 16. The louver 104 is disposed at the front of each of the planes 16a, 16b, and 16c. When compared with a case where the air intake 16 is formed in only the plane 16b, the opening of the air intake 16 becomes longer than the shorter side of the battery pack, so that the flow rate of cooling air is considerably increased. Areas indicated by a broken line in the drawings show the removed corners of the battery pack 10. As a matter of course, when a battery pack is actually manufactured, work for cutting corners is not required. The essential requirement is to form tapered faces at corners of the battery pack 10 from the beginning. Those who are versed in the art can readily understand the term "removal of the corners" as an easy method or conceivable operation for describing the tapered face. When FIG. 1 is compared with FIG. 6 showing the related-art angular battery pack 100, the corners (corner sections) of the battery pack 10 of the present embodiment assume an external appearance defined by obliquely cutting the corners of the related-art battery pack 100 or chamfering both ends of the shorter side.

Figure 4:
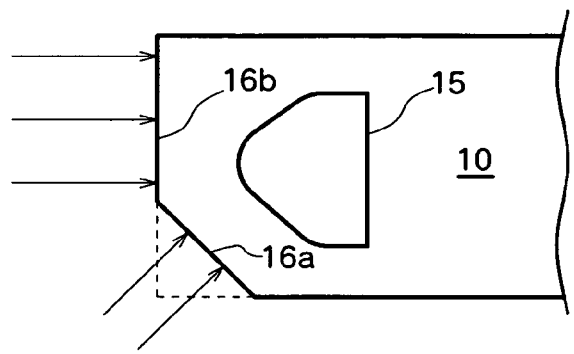
FIG. 4 is another schematic plan view of the air intake of the battery pack.

FIG. 4 schematically shows a plane view of the air intake 16 of another embodiment of the present invention. In FIGS. 1 through 3, the plane (the tapered face) 16a and the plane (the tapered face) 16c are formed at the corners of the battery pack 10. In contrast, the present embodiment relates to a case where only the plane (the tapered face) 16a is formed by means of removing only a corner on one end of the battery pack 10; namely,
the corner located at the foot room side of the passenger of the rear seat; i.e., the corner facing the front side of the vehicle. Even in this case, the air intake 16 is formed in the plane 16a as well as in the plane 16b, to thus be able to compensate for a decrease in the cross-sectional area of the flow passage caused by the louver 104.

Figure 5:
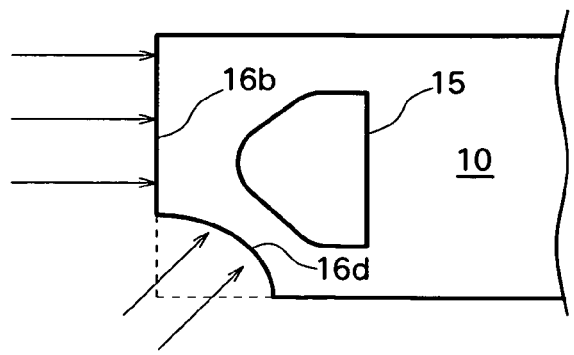
FIG. 5 is yet another schematic plan view of the air intake of the battery pack.

FIG. 5 schematically shows a plan view of the air intake 16 of yet another embodiment of the present invention. In FIG. 4, the plane (the tapered face) 16a is formed by means of linearly removing the corner of the battery pack 10. This embodiment relates to a case where a curved face 16d is formed by means of removing the corner of the battery pack 10. As mentioned above, even when the curved face 16d is formed, the essential requirement is to form the air intake 16 in the curved surface 16d as well as in the plane 16b.

The embodiments of the present invention have been described thus far. However, the present invention is not limited to these embodiments, and is susceptible to other embodiments within the scope of the technical idea of the present invention.

For instance, in the present embodiments, the cooling air is arranged so as to flow from bottom to top within the battery stack 20. However, the cooling air may also be arranged so as to flow from top to bottom within the battery stack 20. In any case, the chamber space 22 for the cooling air is formed in the area of the upper case 12 located above the battery stack 20, and the distribution of flow rate of the cooling air supplied to the chamber space 22 can be adjusted by means of the curved surface of the upper case 12.

The plane (the tapered face) 16a is formed in consideration of the space utility achieved when the battery pack is mounted in the vehicle. However, the plane may assume an arbitrary shape within the scope of the idea of the present invention. The plane may be formed in to a curve by means of which the built-in cooling fan 15 takes in cooling air most efficiently; for example, a curve by means of which cooling air is taken in an essentially vertical direction, so long as the space utility can be ensured.

In the present embodiment, the grid-shaped louver 104 is disposed at the front of the planes 16a, 16b, and 16c or the front of the curved face 16d. However, there is no necessity for the louvers 104 to have the same grid density. The grid density may vary from one plane to another or from one curve to another. The louver 104 is an illustrative member for preventing intrusion of extraneous matter. Another shielding member, such as a filter, can also be provided.

In the present embodiment, the cooling fan 15 is disposed at one end of the battery stack 20 in the direction X, and the air intakes 16 are provided along the shorter side of the battery pack 10 in the vicinity of the cooling fan. However, there may also be adopted a configuration where the cooling fan 15 is disposed opposite the air intake 16 and at the other end of the battery stack 20 in the direction X.

Moreover, in the present embodiment, the cooling fan 15 is incorporated in the battery pack 10. However, the cooling fan 15 may also be provided outside the battery pack 10, so long as the location is on the leeward side with respect to the air intake 16. As in the case of the embodiments, a decrease in the cross-sectional area of the flow passage induced by the louver 104 can be compensated for by means of connecting the battery pack 10 with the cooling fan 15 by way of a duct.

What is claimed is:

1. A battery pack to be mounted in a vehicle, the battery pack comprising:
    a battery stack; and
    a fan built in an end of the battery pack for supplying a medium which adjusts the temperature of the battery stack, wherein two tapered faces are formed at corners of an end where the fan of the battery pack is built in, and wherein the tapered faces are formed by obliquely cutting both corners of the battery pack; and
    an air intake for a medium taken in by the fan is provided in each of three planes including a closest plane opposing the fan at the end of the battery pack and the two tapered faces,
    wherein an opening of each of the air intakes provided in the three planes is equipped with an extraneous matter intrusion prevention member.

2. The battery pack according to claim 1, wherein at least one of the tapered faces forms a plane or a curve.

3. A vehicle driven by a power supply from a battery pack, wherein the battery pack is located below a seat face of a rear seat, the battery pack comprising:
    a battery stack; and
    a fan built in an end of the battery pack for supplying a medium which adjusts the temperature of the battery stack, wherein two tapered faces are formed at corners of an end where the fan of the battery pack is built in, and wherein the tapered faces are formed by obliquely cutting both corners of the battery pack; and an air intake for a medium taken in by the fan is provided in each of three planes including a closest plane opposing the fan at the end of the battery pack and the two tapered faces, wherein an opening of each of the air intakes provided in the three planes is equipped with an extraneous matter intrusion prevention member.

* * * * *